United States Patent [19]

Halout et al.

[11] Patent Number: 5,536,565
[45] Date of Patent: Jul. 16, 1996

[54] LIQUID SEALING GASKET SHEET MATERIALS

[75] Inventors: Nowaf Halout; Alexandra M. Kavoulakis, both of Lancaster; Ellen R. Romano, Elizabethtown, all of Pa.

[73] Assignee: Armstrong World Industries, Inc., Lancaster, Pa.

[21] Appl. No.: 445,901

[22] Filed: May 22, 1995

Related U.S. Application Data

[62] Division of Ser. No. 916,725, Jul. 22, 1992, Pat. No. 5,437,767.

[51] Int. Cl.$^6$ ............................................. B32B 5/16
[52] U.S. Cl. ............................................. 428/283; 428/288
[58] Field of Search ............................................. 428/375, 283, 428/288

[56] References Cited

U.S. PATENT DOCUMENTS

| | | | |
|---|---|---|---|
| 2,248,636 | 7/1941 | Marsden | 106/287 |
| 3,434,917 | 3/1969 | Kraus et al. | 162/3 |
| 4,271,228 | 6/1981 | Foster et al. | 428/281 |
| 4,529,663 | 7/1985 | Lancaster et al. | 428/450 |
| 4,600,201 | 7/1986 | Lonne et al. | 277/1 |
| 4,629,199 | 12/1986 | Yamamoto et al. | 277/204 |
| 4,762,643 | 8/1988 | Bohrn et al. | 252/378 |
| 5,106,790 | 4/1992 | Hashimoto et al. | 501/95 |
| 5,110,413 | 5/1992 | Steer | 162/145 |

FOREIGN PATENT DOCUMENTS

| | | |
|---|---|---|
| 57-109881 | 7/1982 | Japan . |
| 63-105087 | 5/1988 | Japan . |
| 1062381 | 3/1989 | Japan . |
| 2180982 | 7/1990 | Japan . |
| 2061344 | 5/1981 | United Kingdom . |

*Primary Examiner*—Christopher W. Raimund

[57] ABSTRACT

Fluid-sealing gasket sheet materials are described herein which seal particularly well against polar liquids. These gasketing sheets have from about 5 to about 20% fiber, and at least about 62% filler, and a reduced binder concentration, containing about 18% by weight of binder or less, allowing the binder to be reduced even to zero. The filler must be at least about 3% by weight of a gel-forming mineral filler. In addition to giving from good to very excellent seals against polar liquids, this gasketing also has good torque retention and creep resistance.

4 Claims, No Drawings

LIQUID SEALING GASKET SHEET MATERIALS

This is a divisional of application Ser. No. 916,725, filed Jul. 22, 1992, U.S. Pat. No. 5,437,767.

BACKGROUND OF THE INVENTION

1. Field of the Invention

This invention relates to gaskets which seal against liquids. Polar liquids such as mixtures containing water or coolant are frequently encountered in engines. This particular type of gasketing is found in engines. Although the gasketing can seal against all fluids, it is a characteristic of this gasketing that it seals polar liquids particularly well.

The gasketing described herein, therefore, seals particularly well against liquids and liquid mixtures which contain water and/or coolant. Although the gasketing can also seal against non-polar liquids, it forms a better seal against polar liquids than it seals other fluids.

Excellent facing material is provided for cylinder head gaskets which must seal against coolant/water mixtures. The ability to seal against the coolant/water liquids is one of the most desired properties in cylinder head facing sheets.

Engine gasket facings have been prepared from mixtures of fibers, fillers and binders. This type of gasketing material relies on soft binders to achieve a sufficient sealing ability in the gasket sheet. Binders allow a compression of the sheet and obtain a sealing of internal pores. Traditionally, gasketing materials require binder levels which seal out the polar liquids. But, the higher binder levels are more costly, and also result in lower torque retention, an increased creep relaxation, and have a lower temperature stability.

The invention described herein provides gasketing materials which have lower binder levels without a drop in sealability against polar liquids. Specializing in sealing polar liquids, the gasketing described herein gives levels of polar liquid sealability which range from good to very excellent.

The present gasketing sheet materials can lower binder levels to 0% by weight binder. Excellent torque retention and creep resistance are obtained with the lower binder levels. Good to excellent sealability (sealing ability) against or in the presence of polar liquids is obtained even at 0% binder levels.

SUMMARY OF THE INVENTION

The gasket sheet material comprises an optional binder in an amount up to about 18% by total dry weight (TDW), fiber in an amount of from about 5 to about 20% TDW, and a filler at an amount of at least about 62% TDW, said filler including a gel-forming mineral filler.

The gel-forming mineral filler can be present at an amount sufficient to provide a polar liquid sealability level which is at least as good as the seal which would be provided by the gasket sheet if it had at least about 3.5% TDW more binder but with no gel-forming filler. Advantageously, therefore, the presence of such an amount of the gel-forming filler provides a binder concentration reduction of at least about 3.5% TDW. A minimum of about 3% TDW of the gel-forming mineral filler allows the reduction in binder. Good to very excellent sealability against polar liquids, however, is still obtained in spite of the reduced binder concentration.

A good sealability against polar liquids can be obtained in gasketing material which contains at least about 3% TDW of the gel-forming filler. At this level of gel-forming filler, an acceptable (good) rating of sealability against polar liquids has been obtained in gasketing sheet materials. Gasketing with the gel-forming mineral filler can be used to seal any fluid, but they are even better in sealing against polar liquids. The present gasketing, containing the gel-forming filler, seals against non-polar fluids and air as well as the gasket would if the gel-forming mineral were replaced with another filler such as kaolin.

Although it is possible to use compounding methods (such as milling) to make gasketing sheet materials which have the gel-forming filler, these methods normally use a certain amount of binder in order to form the sheet. In addition to this, the properties of the gasket sheet are not as good as the gasketing made by wet-laying. If a compounding method is used, at least about 5% TDW or more of the binder should be included; the binder preferably being in the range of from about 5 to about 18% TDW.

The more preferred gasketing sheet materials are made by wet-laying the ingredients on a Fourdrinier wire. This includes flocculating the ingredients out of an aqueous suspension and then dewatering. The sheet forms readily as the water drains through the wire. The binder concentration can be reduced more in wet-laying, thus providing better properties than the compounding methods. In fact by wet-laying, the binder may be eliminated completely. Better flexibility can also be obtained in wet-laid sheets.

DETAILED DESCRIPTION

Gasketing sheet materials are described herein which can give good to very excellent seals against polar liquids. The instant invention also offers gasketing sheet material in which the binder concentration is reduced but without the loss of sealability against polar liquids which would ordinarily be experienced by a reduced binder concentration in this type of liquid-sealing gasketing material. With the high filler levels, creep resistance and torque retention are both desirably high.

The term "polar liquid" as used herein includes liquids which are slightly polar and have less than complete miscibility in water (for example, alcohols like butyl or isobutyl alcohol). The term "gel-forming mineral filler" is used herein to indicate a mineral filler which characteristically swells and/or forms a gel when it contacts water (or for example, alcohol). These gel-formers are natural or synthetic mineral ingredients. Such gel-forming fillers include clays such as sepiolite, attapulgite, and palygorsklte; in addition to the layered silicates including smectite, montmorillonite, bentonite, hectorite, hydrobiotite, chemically delaminated vermiculite and chemically delaminated mica.

The present gasket materials will also seal other fluids such as isooctane, and even gases. The seal against such non-polar liquids and gases, however, is comparable to the sealability given by gasketing that does not contain the gel-forming filler. The presence of the gel-former, however, gives the instant gasketing materials an unusually high sealing ability against polar liquids. Moreover, gasketing which does not have the gel-forming filler cannot match the high sealing ability (sealability) against polar liquids.

The filler can be a gel-forming mineral filler or it can be a mixture which includes both the gel-former and a non-gelling filler. In order to reduce the binder level with no loss in the sealability against polar liquids, however, the filler must include the gel-forming filler.

A suitable gel-forming filler can be selected from the group consisting of: sepiolite, attapulgite, polygorskite, smectite, montmorillonite, bentonite, hectorite, hydrobiotite, chemically delaminated vermiculite and chemically delaminated mica. A preferred gel-forming filler can be selected from the group consisting of: sepiolite, hectorite, and bentonite. An even more preferred gel-forming filler can be selected from the group consisting of: sepiolite and hectorite, particularly where the binder is used at an amount of about 5% TDW or less in the gasketing sheet. The most preferred gel-forming filler(s) is sepiolite.

The layered silicates and clays can be obtained commercially. Chemically delaminated vermiculite and mica can also be prepared in accordance with the methods described in such references as: U.S. Pat. No. 4,800,014; U.S. Pat. No. 3,325,340; and U.S. Pat. No. 4,297,139.

The filler in these gasketing sheets can include a non-gelling type of filler. This type of filler can be inorganic or organic. Most preferably, it is mineral. A non-gelling filler can be selected from the group consisting of: calcium silicate, mica, pyrophyllite, exfoliated vermiculite, talc, calcium carbonate, magnesium hydroxide, diatomaceous earth, phlogopite, silica, kaolinite, graphite, flake graphite, and cork. Clays (such as kaolinite) are preferred fillers. The most preferable non-gelling filler can be selected from the group consisting of: talc, mica, kaolin, and diatomaceous earth.

The non-gel forming filler included in the present gesketing is preferred to have at least about 75% by weight of the particles less than 2 microns in diameter. If the filler cannot be commercially obtained in this particle size, the particle size of the filler can be reduced by such methods as grinding.

The filler is included at an amount of at least about 62% TDW. That total amount of filler must include the gel-forming filler. The gel-forming filler can be used at an amount sufficient to provide a polar liquid sealability level which is at least as good as the seal which would be provided by the gasket sheet if it had at least about 3.5% TDW (by total dry wt.) more binder but with no gel-forming filler. Generally these gasketing materials will contain the gel-forming filler at an amount of at least about 3% by weight of the total gasket sheet. Gasketing with 3% TDW of the gel-forming filler has given good (acceptable) sealability of polar liquids, and in addition to this, the binder level can be reduced.

The comparison of Example 8 (which had no gel-forming filler) with Example 7 which contained less binder and included the gel-forming filler, demonstrates that by including at least about 4.5% TDW of the gel-forming filler a reduction in binder concentration of at least about 4.5 to 5% TDW can be made while still obtaining a good sealability rating.

Since the binder can be completely eliminated, and the filler used can be 100% mineral gel-former, the amount of the gel-forming filler can range up to about 95% TDW. Preferably the gel-forming filler is used at an amount of at least about 7% TDW; a preferred range is from about 7% to about 55% by total dry weight (TDW) of the gasket sheet material, and more preferably the total amount of filler is from about 9 to about 42% TDW of the gel-forming mineral filler.

With the gel-forming filler and low binder concentrations, the gaskettng sheets of the present invention have better sealing ability (sealability) against polar liquids combined with good to excellent torque retention and creep resistance properties. The combination of these properties in a gasket sheet is not matched by other gasketing which does not have the gel-forming filler. For example, by having a binder level of about 10 or about 15% TDW in a gasket without the gel-forming filler, a good or very good sealability against polar liquids can be obtained, but the torque retention and creep resistance would be undesirably low, the material having inadequate properties for many gasketing applications. In addition to this, there are some types of gaskets needing high sealability and also temperature resistance and/or good torque retention and creep resistance. The gasketing of the instant application can provide a gasket sheet having all of these characteristics. If the gel-forming mineral were not present, the gasket would need a binder level of at least 20% or more to get excellent sealability against polar liquids. Even with higher binder levels, a substantial cellulose concentration is frequently needed to obtain the sealability levels required. With the cellulose, however, the gasket would not have the heat resistance to qualify for heat exposure over 400° F., and the higher binder levels result in poor creep resistance and torque retention. This can be appreciated from Example 32, which had the binder at 20% TDW with the consequently low torque retention.

In accordance with the instant invention, however, the gel-forming mineral filler can be used. Increasing amounts of the gel-forming mineral will give very good, excellent or very excellent sealability. Advantageously, less binder is used also. A lower creep relaxation and higher torque retention at excellent performance levels are easily attained.

The fiber used can be organic or inorganic. The organic fiber can be synthetic or natural. The inorganic fiber can be mineral, metal, or synthetically made non-carbon fiber. Inorganic fibers that are preferred can be selected from the group consisting of: fiberglass, mineral wool, wollastonite, and ceramic. Organic fibers can be selected from the group consisting of: cellulose, carbon, cotton, polyamide, polybenzimidazole, polyaramid, acrylic, phenolic, polyester, polyethylene, polypropylene, and other types of polyoleftns. Preferably, the gasketing will include glass fiber and organic fiber. A preferred combination of fibers to use in gaskets for sealing against aqueous (water containing) liquids is: glass and aramid or glass and acrylic. It is preferred that cellulose fiber is used in combination with glass, glass and aramid, or glass and acrylic fiber. Cellulose, especially in more substantial amounts (greater than about 5%), is used with emodiments of gasketing which will be exposed to temperatures less than about 400° F.

Binders range in amounts from 0 up to about 18% TDW of the gasketing sheet. When the binder is included, it is present at from about 0.5 to about 18% TDW. In preferred emodiments, the binder is used at an amount less than about 15% TDW; a preferred range being from about 3% to about 15% TDW. Most preferably the binder is present in the range of from about 5 to about 13% TDW of the total dry solids. If compounding methods are used to prepare the gasketing sheet, the binder preferably, will range from about 5 to about 18% TDW. Wet-laying methods can provide polar-liquid sealing gasketing sheet material containing less than about 5% (by TDW) of the binder. At least about 12% by weight of the gel-forming mineral filler can preferably be used in a gasket to obtain very good sealability against polar liquids.

Any binder that will hold fibers and fillers can be used in these gasketing sheets. Any binder suitable for the preparation method utilized can be selected. A suitable binder can be selected from the group consisting of: isoprene rubber, styrene butadiene rubber, carboxylated styrene butadiene rubber, nitrile rubber, acrylonitrile butadiene rubber, carboxylated acrylonitrile butadiene rubber, chloroprene rubber, silicone rubber, urethane, acrylic, ethylene-propylene-diamine rubber (EPDR), vinyl chloride, acrylonitrilebutadiene-styrene, and vinylidene chloride. Fluorinated elastomers can also be used. Latex binders are most preferred. If the gasketing is being wet-laid any water dispersible binder is suitable.

If a gasketing sheet is made by compounding, the gel-forming filler is mixed with a sufficient amount of a liquid (such as water, alcohol, etc.) to form the gel. For this preparation method at least about 5% TDW binder will be needed. The mixed ingredients are then spread (or laid) out in a sheet or layer, and dried. Preferably the binder is water miscible.

Preferably, the instant liquid sealing gaskets are made by wet-laying. The gaskets obtained by this method have better sealability than the gaskets of the same formulation which have been made by compounding. Using the wet-laying process, the ingredients (fiber, filler, and an optional binder) are flocculated out of an aqueous suspension. Additives such as papermaker's alum are added in amounts effective to achieve flocculation (generally from about 0.02 to about 6% by weight).

After the binder has precipitated out of the suspension in flocculation, the ingredients are dewatered by wet-laying the flocculated solids (ingredients) into a substantially homogeneous sheet material. Wet-laying can be done with or without pressing. The gasket sheet material is then dried. Usually a sheet-forming (papermaking) apparatus is used. As a general rule, at least about 90% of the solids are retained, recovery normally being in the range of from about 90 to about 99%. A good (and obtainable) solids recovery is about 98% or more solids retention.

In preferred embodiments for preparing gaskets having improved sealability against polar liquids, the fiber and filler are combined in an aqueous suspension. In preparing the suspension, an amount of water is used which is sufficient to put the solids level suitably at from about 0.5 to about 3% or more preferably at from about 0.5 to about 2%. Agitation can be used to saturate the solid ingredients and achieve a uniformly mixed suspension of the solids. Agitation is also preferably applied while mixing the ingredients in the suspension, and/or during the addition of the flocculant, and/or during flocculation.

The binder (when used) can be added either before or after the flocculant. Binders can be mixed in the suspension with the filler and fiber, but the preferred embodiments call for adding the binder to the flocculation bath after the flocculant is added and before wet-laying is begun.

A "flocculant" is any additive or agent (including "coagulants") which brings the binder, fiber, and filler out of the aqueous suspension for dewatering. Both flocculants and coagulants can be used for this. Flocculants and/or coagulants are well known in papermaking. One or more may be used. Suitable flocculants include polyelectrolytes and/or soluble salts. The soluble salts are preferred. Preferred soluble salt flocculants can be selected from the group consisting of: aluminum salts, ferric salts, and stannic salts. Polyelectrolytes are low molecular weight polymers which reverse the charge on particle surfaces. Preferred polyelectrolytes have molecular weights ranging from about 10,000 up to about 1,000,000 and charge densities ranging from 3 to 8 milliequivalents/gram. Suitable polyelectrolytes include polyethylenelmines, polyamines, substituted polyamines, etc. A preferred polyelectrolyte is poly(diallyldimethylammonium) chloride whose molecular weight is between 100,000 and 400,000 and whose charge density is 6.2 milliequivalents/gram.

In preferred embodiments, after the latex has precipitated (during flocculation), additives such as drainage aids and retention aids are added (with or without continued agitation). These additives can be similar to the polyelectrolyte-flocculant, and range from 100,000 up to 10,000,000 in molecular weight. Some of these additives are charged and have charge densities ranging from about 3 down to 0.1 milliequivalents/gram in charge densities. They may be cationic, anionic, or nonionic and include polyacrylamides, copolymers of acrylamide with substituted acrylates, polyethyleneimides, etc.

The water is then drained from the slurry through a screen or on a typical Fourdrinier paper line to produce a sheet. At this time the sheet can also be pressed if desired. The gasketing sheet material is then dried. Preferably the sheet material is drum dried and then calendered.

Additional ingredients which are commonly used in gaskets can also be included in the present gasketing. Such materials, for example, include curing agents, pigments, and antioxidants. This also includes the additives which are included as processing aids during the preparation of the gasketing. Such additives can include dispersing agents, retention aids, and drainage aids as well as chemicals to adjust the pH.

Adjustments to the pH are preferably made by adding a base. A pH in the range of from about 6 to about 9 is preferred. Any base capable of adjusting the water to the desired pH can be used. Alkali metal and alkaline-earth metal hydroxides are preferred. A preferred base can also be selected from sodium aluminate, sodium carbonate, and sodium hydroxide. Suitably the base can be added to the water when preparing the suspension or at any other time before dewatering. For preferred embodiments, it is added either directly before or after the flocculant.

The instant gasketing sheet materials can provide sealability of all fluids. Good seals against non-polar fluids (such as isooctane) can be obtained. For non-polar fluids, however, it is preferred that the binder be in the range of from about 5 to about 18% by weight. The instant gasket materials which have at least about 5% TDW of binder have good sealability against the non-polar liquids (this has been noted using ASTM method F-38); and at any given filler concentration, more gel-forming filler can be included (and less non-gelling filler) to have a gasket with an even better sealability against polar liquids.

Since binder levels are lower, creep relaxation is lower for these gasketing sheets. They also have a high torque retention. With these qualities and characteristics, the present gasketing sheets are excellent engine gaskets. Polar-liquid sealing gaskets are gaskets which contain the instant gel-forming filler so that they can provide a seal against and/or provide a seal in the presence of polar liquids such as water, ethylene glycol and other coolants. These gaskets, therefore, are particularly good for sealing water, coolant, water/oil mixtures, and water/coolant mixtures; the gaskets, furthermore, can be used as a sealing gasket for any fluid type.

The instant gasketing sheets can be made into gasket facings, for example, such as cylinder head facings for the cylinder head gasket. Facing sheets can be saturated with binder-types of ingredients and given coatings. This can be done after the sheet is prepared and/or after it is put onto the supporting gasket core. Added saturation steps (such as impregnation, coating, and immersion) for facing materials fill internal pores and enable the sheet to give the performance required of a cylinder head gasket.

The level of sealability which is needed in a gasket will depend on the particular application of the gasket. Thus, a more preferred (excellent) sealer is needed where the gasket is needed for 1) a low flange pressure, 2) a high internal pressure of the polar liquid against the gasket seal, or 3) an uneven flange surface. For a more preferred (excellent) level of sealability, the particular type (or formulation) of gasketing sheet material should give a coolant leakage rating of about 40 or more at 1500 PSI (flange pressure) in the coolant leakage rating test which is described in the examples which follow. The most preferred gasketing sheet materials will have a coolant leakage rating of 60 (very excellent) at 1500 PSI flange pressure; an acceptable (suitable) coolant leakage rating down to 10 at 1500 PSI flange pressure (for good sealability). A preferred polar liquid sealing gasket material (for a very good sealability) has a rating down to about 20 at 1500 PSI flange pressure when it is tested on the Coolant Leakage Rating Rig.

Gaskets with good (acceptable) sealing ability can easily be used for 1) higher flange pressures, 2) on smoother and/or more even flange surfaces, or 3) in locations having low internal pressures (20 PSI or less) of the fluid against the seal of the gasket. Gaskets with better sealing ability, however, are more preferred over the good sealers which have a rating of only 10 at 1500 PSI on the Coolant Liquid Rating Rig. To get the preferred, more preferred, and most preferred polar liquid sealability levels in the gasketing sheet materials, the amount of gel-forming filler is increased.

An acceptable sealing ability can be achieved in gasketing which is about 3% (TDW) or more in the gel-forming filler. At least about 12% by weight of the gel-forming mineral filler can be used to obtain a very good and even very excellent sealability against polar liquids. At least about 16% by weight of the gel-forming filler is preferred to obtain a gasket with a higher sealability; the more preferred and most preferred sealability ratings can be achieved. A preferred range is from about 16 to about 55% of the gel-forming filler in the gasket. Sealability does increase with an increased concentration of gel-forming filler in the total amount of filler, although the most preferred sealability level can be achieved with mixtures of gel-forming and non-gel forming fillers.

There is more than one important characteristic and requirement which is considered in preparing and formulating gaskets. Preferred embodiments of the gasket sheet materials have a filler which is from about 7 to about 55% TDW of the gel-forming filler. Gasketing which has a non-gelling filler and a gel-forming filler is preferred for ease of processing, handling and having better handling properties than a gasket where the filler is only the gel-forming filler. In addition to this, preparation is more difficult when the filler consists only of the gel-former because drainage becomes increasingly more difficult as the concentration of the gel-forming filler increases over about 50% (by weight) of the total amount of filler. Preferred embodiments in the wet-laid processes, therefore, will have the gel-forming mineral filler being included in an amount less than about 50% by weight of the total amount of filler.

The following examples are offered to illustrate the instant invention. All parts and percentages which are given in the examples which follow are by weight unless otherwise indicated.

EXAMPLES

I. Preparation procedure for the gasketing in Examples 1–33:

The suspensions were made by mixing (for 30 sec.) the filler(s) and fiber in two different 600 ml (milliliters) portions of water. The fiber and filler suspensions were then combined in a bucket and diluted to 2% solids by adding water (for a total of 4100 ml at approximately 100° F.). This suspension was mixed for at least one minute at 600 rpm with an electric stirrer, before adding the first portion of the polyelectrolyte flocculant, poly(diallyldimethylammonium) (DADMAC). Stirring continued, and when indicated in the examples, after the addition of the latex, a second portion of DADMAC was added. Stirring was maintained until the latex had precipitated onto the fibers and fillers. At this point, it was observed that the supernatant water was clear. The handsheet was formed using a Williams handsheet mold, the sheet was wet pressed, and then drum dried at approximately 230° F. The sheets were calendered to approximately 75 lb/cubic foot density and 1/32 in. gauge and tested.

The percentages given in the examples that follow are made on the basis of the dry weight of the total of binder, total filler, and fiber. In all of the examples which follow, unless otherwise indicated, the final dry sheet weight was 82 grams. Where the amount of binder is given, the amount shown is the dry solids.

II. Sealability (sealing ability) against polar liquids is shown and rated with measurements taken by a Coolant Leakage Rating Rig. The object of this test is to rate the sealability of gasket materials under actual performance conditions. Thus, a polar liquid is used, and put under pressure inside the cylinders, and is heated.

A. Testing Apparatus: With the Coolant Leakage Rating Rig, during the sealability test, a mixture which is a 50/50 (volume) ratio of water and coolant is delivered to the inside of three separate, identical cylinders. The piping containing the liquid is separate and each of the cylinders is individually sealed off. Each cylinder holds the liquid at an internal fluid pressure which can go from 0 up to a maximum of 150 PSIG.

Each cylinder splits into an upper part and lower part which are put together with the gasket material held between the upper and lower parts (in a flange arrangement). A specifically desired and separate flange pressure can be put on the gasket material in the flange of each cylinder. The maximum flange pressure can be 2500 PSI; the lowest is around 250–200 PSI. The fluid inside can be maintained at any temperature from ambient temperatures up to 195° F.

B. Test Procedure: The gasketing materials which are shown in the examples which follow were all tested for their polar liquid sealability rating using the Coolant Leakage Rating Rig in accordance with the following procedure.

For a more realistic test of sealability, the liquid was heated in the following experiments since hot fluids are encountered in internal combustion engines. The coolant/water mixture was heated at the beginning of each test and was then maintained at 195° F.

At the beginning of the test, the liquid inside of the cylinder was under 0 PSIG (internal pressure); and it was at 0 for the first 5 minutes of the test. The rating of sealability begins to run in the first minute, the lowest rating being 1. The rating increases by 1 for each minute of the test. The rating thus expresses the number of minutes that the gasket held the hot polar liquid without having a leak.

After each 5 minute time interval, the pressure of the liquid inside the cylinder is put up by 15 PSI. At the first increase, the pressure goes from 0 PSIG to 15 PSIG at minute 6 of the test period. The highest internal pressure which is put on the liquid is 150 PSIG. The pressure is put up for minute 51 of the test and after this pressure increase this period is extended for a total length of 10 more minutes, so that the rating goes up to 60, and the test is finished. Thus, the maximum sealability rating possible is 60.

In the test procedure any gasketing which leaks at the very beginning of the first minute after a 15 PSI (pound per square inch) pressure increase was given the rating number of the last minute before the pressure increase. Thus, a rating of 10 indicates that the gasketing started leaking at the beginning of minute 11 of the test under 30 PSIG. The following chart shows the internal pressure level in PSIG (pounds per square inch gauge) alongside the minute rating to which it corresponds.

| PSIG | MINUTE-RATINGS | PSIG | MINUTE-RATINGS |
| --- | --- | --- | --- |
| 0 | 1–5 | 90 | 31–35 |
| 15 | 6–10 | 105 | 36–40 |
| 30 | 11–15 | 120 | 41–45 |
| 45 | 16–20 | 135 | 46–50 |
| 60 | 21–25 | 150 | 51–60 |
| 75 | 26–30 | | |

C. The sealability of each gasketing material is seen from the rating and data which follow.

1) Sealability of an individual gasket material can be seen by noting the Leakage Rating at the measured flange pressures and comparing those results against other examples.

2) In addition to that, commercially suitable wet-laid gasket sheet materials (suitable for cylinder head facing) which are also wet-laid and have the composition 9% (TDW) NBR/carboxylated NBR latex binder, 13.5% (TDW) aramid/fiberglass mixture, and 76% (TDW) filler give the following measured Leakage Ratings:

| Coolant Leakage Rating | | |
| --- | --- | --- |
| 500 psi | 1500 psi | 2500 psi |
| 7 | 10 | 13 |

The above material is commercially suitable and has shown a suitable sealing ability. The rating given by this material is an acceptable (good) sealability rating.

3) Another commercially available gasket sheet material having very good sealability is a wet-laid gasket sheet which has the composition 9.7% (TDW) fiber, 76.5% (TDW) kaolin filler which has 55% of its particles less than 2 microns in size, 11.2% (TDW) NBR binder, and 2.6% pigment and additive. This material gives a coolant leakage rating of 20 or more at the flange pressure of 1500 PSI on the Coolant Leakage Rating Rig. This rating is described and designated as "very good".

4) A gasket with an excellent sealability gives a rating of 40 or more at 1500 PSI on the Coolant Leakage Rating Rig, and a very excellent sealability rating is 60 at 1500 PSI (flange pressure) which is the highest rating possible on this equipment.

The 1500 PSI flange pressure level herein indicates whether the gasketing material has a poor or a good to very excellent sealability characteristic against polar fluids. Although a good rating at 500 PSI is impressive because it is the hardest flange pressure to seal well at (because this flange pressure is so low), it is likely that some other factor inherent to the individual gasket (such as a spot imperfection) might affect the rating at the 500 PSI level. A more reliable indication of good sealability, therefore, is obtained at 1500 PSI flange pressure. In addition to this, higher pressures of at least about 1000 PSI is generally the pressure at which cylinder head gasketing is used. This gasketing moreover must seal against polar fluids.

III. Gasketing with higher sealability is particularly advantageous. Commercial gasketing sheet materials (made with fiber, filler, and binder) which rate 10 at 1500 PSI are sometimes subjected to processing steps in order to make the gasketing sheet material into the particular type of sealing gasket which is needed (such as cylinder head gasket facings which must seal against polar liquids). Processing methods call for a) impregnating the sheet with liquid sealers and binder-coatings which fill in cavities and spaces and b) coating the sheet.

If the gasket has a higher sealability rating, less liquid sealer and/or binder-coating will be needed. Some processing steps can be omitted where the gasket sheet material has a high enough sealability. Gasket sheet materials which have a rating of 40 or greater in the Coolant Leakage Rating Rigare candidates for using less of such coating and sealing materials or omitting impregnation. In preferred embodiments, to advantageously allow the omission of further processing steps (such as impregnation), or to allow the use of less impregnation fluid or coating material, the gasket sheet materials will include the gel-forming filler in an amount effective to give the material a polar liquid sealability rating of 40 or higher at 1500 PSI. For the 40 or higher rating, the gel-forming mineral filler is generally found to be at the preferred concentration levels of at least about 18% TDW or more.

Under the rating designations (of the Coolant Leakage Rating Rig) the gasketing sealability is: good (saltable or acceptable) if it is 10 or more (a rating of 10–19) at 1500 PSI flange pressure; very good (preferred) if it is 20 or more (a rating of 20–39) at 1500 PSI; excellent (highly preferred or more highly preferred) if it is 40 or more (a rating of 40–59) at 1500 PSI; and very excellent (most highly preferred) when the sealability rating is 60 at. 1500 PSI.

EXAMPLES 1–5

Gaskets were made to compare the performance of the non-gelling mica mineral filler to gaskets which had one type of gel-forming filler in each. Two different particle sizes of the mineral mica are shown.

The gel-forming fillers used in Examples 1–3 are: attapulgite, chemically delaminated vermiculite and sepiolite. Kaolin clay filler was used as a non-gel forming filler in all of Examples 1–5, and it was used in the same amount for all of them.

Except for the vermiculite, all of the fillers were supplied ores. The vermiculite was a dispersion (from W. R. Grace). Deionized water was used for the precipitation which contained vermicultte dispersion instead of ordinary tap water in order to avoid undesired replacement of cations in the vermiculite.

Examples 1–5 all had the following ingredients:

1) binder - acrylonitrile butadiene rubber (NBR) at 6.6% by wt. (dry solids);

2) fiber - aramid at 4.7% by wt. and glass fibers at 9.4% by wt;

3) kaolin clay (a non-gelling filler) at 47.6% by wt.

The gasketing sheet prepared by these examples only differed by the type of the second filler:

Ex. 1 - sepiolite at 31.7% by wt.

Ex. 2 - attapulgite at 31.7% by wt.

Ex. 3 - delaminated vermiculite at 31.7% by wt.

Ex. 4 - ground mica (200 U.S. Std. mesh) at 31.7% by wt.

Ex. 5 - ground mica (325 U.S. Std. mesh) at 31.7% by wt.

The ground mica for Ex. 4 and 5 was a natural mineral and was non-gelling. The second fillers used in Examples 1–3 were all the type which absorb water to form a gel (a gelling filler).

For Examples 1–2 and 4–5 the first portion of polyelectrolyte (DADMAC) added was 0.06 g (grams) and the second portion was 0.05 g. For Example 3, the first portion was 0.2 g and the second portion of DADMAC was 0.3 g. The sheet weight for Examples 1–5 was 82 grams.

All of the gasketing of Examples 1–5 had the identical formulation except for the second filler type used. The leakage testing showed that better sealability was obtained in the gasketing which contained the mineral fillers which could be described as gel-formers (Exs. 1–3).

| Ex. # | | Density (lb/ ft³) | Coolant Leakage Rating | | |
|---|---|---|---|---|---|
| | | | 500 psi | 1500 psi | 2500 psi |
| 1 | sepiolite | 74 | 21 | 36 | 55 |
| 2 | attapulgite | 72 | 24 | 43 | 60 |
| 3 | vermiculite | 73 | 26 | 50 | 60 |
| 4 | mica-200 | 73 | 8 | 13 | 20 |
| 5 | mica-325 | 73 | 4 | 17 | 20 |

EXAMPLES 6–7

These examples can be compared to show that a low level of sepiolite can improve sealability. It is important to note that Example 7 had the best sealing ability and further gave a better seal than Comparative Example 8 which contains approximately 4.45% by wt. more binder.

DADMAC was again used as the polyelectrolyte. The amounts of the solids ingredients is given below in percent (%) by total dry weight. This percentage is the percent of the total sheet weight which was 81.5 g for Examples 6–7.

The previously described method was used to prepare these materials except that, in Examples 6 and 7, one portion of polyelectrolyte was added and the sepiolite was pre-dispersed in 300 ml of water before blending it with the other fillers. The gel-forming filler was sepiolite. The non-gel forming fillers are kaolin and phlogopite.

| Ingredient | Ex. 6 | Ex. 7 |
|---|---|---|
| Glass Fiber | 9.4% | 9.0% |
| Aramid Fiber | 4.7% | 4.5% |
| Kaolin | 63.4% | 60.5% |
| Phlogopite | 16.0% | 15.2% |
| Sepiolite | — | 4.5% |
| NBR Latex | 6.5% | 6.3% |
| DADMAC | 0.14 g | 0.17 g |

It should be noted that the combination of kaolin and phlogopite gives poor sealing characteristics; reflected in the low coolant leakage values (shown in the table below) for these examples. However, even the small addition of the sepiolite shows an improvement in the rating.

| | Density (lb/ ft³) | Coolant Leakage Rating 1500 psi |
|---|---|---|
| Ex. 6 | 75 | 9 |
| Ex. 7 | 77 | 13 |

The previously described method was again used, except that for Example 8 the first addition of polyelectrolyte was made to the fillers in only 1000 ml of water, the second was made to the fiber and filler combined in a total of 4650 ml of water, followed by the addition of the latex with 0.45 g of an antioxidant and 0.45 g of a cure package. Total sheet weight was 82 grams.

| Ingredient | Ex. 8 |
|---|---|
| Glass Fiber | 10.3% |
| Aramid Fiber | 3.2% |
| Kaolin | 60.5% |
| Phlogopite | 15.25% |
| Sepiolite | — |
| NBR Latex | 10.75% |
| DADMAC (two portions) | (a) .05 g and (b) .15 g |

| Density (lb/ft³) | Coolant Leakage Rating 1500 psi |
|---|---|
| 76 | 11 |

Comparison with Example 7, however, confirms that the addition of the sepiolite gives the gasket better sealability in spite of the lowering of the latex binder concentration (by approximately 4.45%).

EXAMPLES 9–11

In these examples, different fiber types were used. The gasketing samples were prepared using the same preparation as was used for Example 8. These examples also show a three filler system and a higher level of latex binder with the cure package and antioxidant (both at 0.45 g). As for Example 8, the latex was mixed with the cure package and antioxidant, and was added approximately one minute after the second polyelectrolyte addition. Total sheet weight for Examples 9–11 was 106.9 grams.

| Ingredient | Ex. 9 | Ex. 10 | Ex. 11 |
|---|---|---|---|
| Glass Fiber | 10.0% | 10.0% | 10.0% |
| Aramid Fiber | 3.0% | — | — |
| Acrylic Fiber | — | 3.0% | — |
| Cellulose Fiber | — | — | 3.0% |
| Kaolin | 58.8% | 58.8% | 58.8% |
| Phlogopite | 14.8% | 14.8% | 14.8% |
| Sepiolite | 3% | 3% | 3% |
| NBR Latex | 10.4% | 10.4% | 10.4% |
| DADMAC | | | |
| Portion 1 | 0.05 g | 0.05 g | 0.05 g |
| Portion 2 | 0.15 g | 0.15 g | 0.15 g |

| | Density (lb/ ft³) | Coolant Leakage Rating 1500 psi |
|---|---|---|
| Ex. 9 | 78 | 13 |
| Ex. 10 | 78 | 14 |
| Ex. 11 | 78 | 17 |

The cellulosic fibers also improve sealability (sealing ability), although cellulosic fibers have poor heat resistance so that other important gasket characteristics (such as torque retention and creep resistance) would not be as good with such fibers in excess of 400° F. Thus, it is more preferred to include the mineral gel-formers as fillers, which gives the gasket good properties at higher temperatures, providing good sealability and also good torque retention and creep resistance.

EXAMPLES 12–15

Better sealability is shown by the results below as sepiolite is blended in increasing amounts with kaolin. A cationic polyacrylamide was used as a drainage aid, added before the stock is poured into the handsheet mold. The kaolin had approximately 55% of the particles less than 2 microns.

| Ingredient | Ex. 12 | Ex. 13 | Ex. 14 | Ex. 15 |
|---|---|---|---|---|
| Glass Fiber | 9.4% | 9.4% | 9.4% | 9.4% |
| Aramid Fiber | 4.7% | 4.7% | 4.7% | 4.7% |
| Kaolin | 79.3% | 55% | 39.65% | — |
| Sepiolite | — | 24.3% | 39.65% | 79.3% |
| NBR Latex | 6.6% | 6.6% | 6.6% | 6.6% |
| DADMAC | | | | |
| Portion 1 | 0.02 g | 0.10 g | 0.16 g | 0.33 g |
| Portion 2 | 0.07 g | 0.07 g | 0.07 g | 0.07 g |
| Drainage Aid | 0.03 g | 0.03 g | 0.03 g | 0.03 g |

The table below shows that the Coolant Leakage Rating increases in samples with increasing amounts of the gel-forming sepiolite clay. The use of the drainage aid does not interfere with the property improvement.

| | Density | Coolant Leakage Rating | | |
|---|---|---|---|---|
| | (lb/ft$^3$) | 500 psi | 1500 psi | 2500 psi |
| Ex. 12 | 76 | 9 | 17 | 28 |
| Ex. 13 | 77 | 14 | 30 | 33 |
| Ex. 14 | 74 | 16 | 39 | 60 |
| Ex. 15 | 76 | 23 | 60 | 60 |

EXAMPLE 16

Another gasketing sheet was prepared which had the identical formulation as Example 14, except the kaolin used had approximately 90% of the particles less than 2 microns.

| | Filler | 500 psi | 1500 psi | 2500 psi |
|---|---|---|---|---|
| Ex. 16 | Kaolin | 22 | 60 | 60 |

By comparing the above results to those of Example 14, it can be seen that the smaller particle size gave better sealability; hence, the non-gel forming filler included in the present gasketing is preferred to have at least about 75% of the particles less than 2 microns in diameter. Some fillers, such as kaolin, can be commercially obtained or the particle size can be reduced by such methods as grinding.

Torque retention:

A torque retention test was also done on this sample. The standard sample cut for the test was rectangular with a hole in the center for the flange bolt. The sample had a 2 sq. in. area of contact with the flange. The gasketing material was put on the base of the flange fixture and the upper piece of the flange was put on top and was bolted into place, putting a torque of 200 in-lb (inch-pound) on the bolt which held the flange in place. The flange fixture was put into an oven that was preheated to 600° F. After 6 hours it was removed and the fixture cooled overnight at ambient conditions. The breakaway torque required to move the bolt tighter was measured using a torque wrench, and the percent torque which was retained was calculated.

A retention of 60% is considered good, a retention of 70% is very good, 80% is considered excellent, and 100% is ideal (or very excellent).

The gasketing material (of Example 16) gave a very excellent (ideal) torque retention, measuring 100% torque retained.

EXAMPLES 17–19

The following Examples also had the exact formulation as Example 14 above, except that different fillers were substituted in the same amount for the kaolin.

The attapulgite and sepiolite shows a combination where the filler is only gel-forming fillers. This Example (19) had the highest Coolant Leakage Rating possible for the, two top flange pressures and was the highest of the three at the lowest flange pressure.

| | | Coolant Leakage Rating | | |
|---|---|---|---|---|
| Ex. | Filler | 500 psi | 1500 psi | 2500 psi |
| 17 | Talc | 21 | 60 | 60 |
| 18 | Microsilica | 13 | 46 | 60 |
| 19 | Attapulgite | 30 | 60 | 60 |

All three of these gasketing samples were also measured for torque retention. The procedure described for Example 16 was used and the results are given below.

| Ex. | Filler | Torque Retention |
|---|---|---|
| 17 | Talc | 81% |
| 18 | Microsilica | 100% |
| 19 | Attapulgite | 100% |

All of the fillers had good to excellent torque retention. Due to the constant level of the binder, the torque retentions were all the same except for the talc, which is not as good for torque retention as the other fillers.

EXAMPLES 20–21

Examples 20 and 21 illustrate a three-filler system. The same method described for Example 14 was used.

| Ingredient | Ex. 20 | Ex. 21 |
|---|---|---|
| Glass Fiber | 9.1% | 9.1% |
| Aramid Fiber | 4.5% | 4.5% |
| Kaolin | 35% | 31.825% |
| Talc | 35% | 31.825% |
| Sepialite | 7.3% | 13.6% |
| NBR Latex | 9.1% | 9.1% |
| DADMAC | | |
| Portion 1 | 0.15 g | 0.15 g |
| Portion 2 | 0.10 g | 0.10 g |

The sealability of these gasket sheets is shown the excellent Coolant Leakage Ratings given by the samples. Even better sealability is seen with the increased level of sepiolite.

| | Density | Coolant Leakage Rating | | |
|---|---|---|---|---|
| | (lb/ft³) | 500 psi | 1500 psi | 2500 psi |
| Ex. 20 | 83 | 23 | 50 | 60 |
| Ex. 21 | 86 | 29 | 60 | 60 |

EXAMPLES 22–23

Styrene-butadiene rubber latex (from Reichhold) was used in a formulation identical to the NBR latex binder.

The method previously described was used. Flocculation was done by adding 0.4 g of the polyelectrolyte (DADMAC). The latex was then added along with 0.28 g of antioxidant (from Harwick Chemical Co.) to the slurry of fibers and fillers.

| Ingredient | Ex. 22 | Ex. 23 |
|---|---|---|
| Glass Fiber | 9.3% | 9.3% |
| Aramid Fiber | 4.7% | 4.7% |
| Kaolin | 30.4% | 30.4% |
| Talc | 30.4% | 30.4% |
| Sepiolite | 18.7% | 18.7% |
| NBR Latex | 6.5% | — |
| SBR Latex | — | 6.5% |

Sealability is indicated by the Coolant Leakage Rating at the 1500 psi flange pressure. Although the results do indicate that SBR could be used (in a more preferred embodiment) for even higher sealability, the SBR is not preferred in all embodiments. The NBR is better than SBR for higher temperatures, and is preferred as it gives better overall gasket characteristics (such as torque retention and creep resistance) for high temperature applications (such as cylinder head gaskets).

| | Density (lb/ft3) | Coolant Leakage Rating 1500 psi |
|---|---|---|
| Ex. 22 | 72 | 28 |
| Ex. 23 | 73 | 34 |

EXAMPLES 24–26

These examples compare gasketing with a larger concentration of hectorite (Ex. 25) to a gasketing sheet with a lower amount of hectorite (Ex. 24) and the same amount of binder to a gasketing sheet which did not include a binder (Ex. 26). The results show that the latex can be reduced to zero while good coolant leakage ratings are maintained. Total sheet weight was 76.61 grams for Ex. 26 and 82 grams for Exs. 24 and 25.

The previously described method was used.

| Ingredient | Ex. 24 | Ex. 25 | Ex. 26 |
|---|---|---|---|
| Glass Fiber | 9.3% | 9.3% | 10.0% |
| Aramid Fiber | 4.6% | 4.6% | 5.0% |
| Kaolin | 30.4% | 30.4% | 32.5% |
| Talc | 30.4% | 18.7% | 32.5% |
| Hectorite | 18.7% | 30.4% | 20.0% |
| NBR Latex | 6.5% | 6.5% | — |
| DADMAC | 0.90 g | 1.50 g | 0.20 g |

The coolant leakage ratings are compared at the 1500 psi flange pressure. The Creep Relaxation (done according to ASTM Test Method No. F 38–88 Method B) uses a heat treatment of 22 hours at 400° F.

The advantage of using the instant invention and decreasing or eliminating the binder is especially emphasized in Example 26 which completely eliminated the latex binder.

| | Density (lb/ft³) | Coolant Leakage Rating 1500 psi | Creep Relaxation |
|---|---|---|---|
| Ex. 24 | 73 | 41 | 28% |
| Ex. 25 | 73 | 46 | 29% |
| Ex. 26 | 75 | 49 | 8% |

EXAMPLE 27

Two gel-forming fillers (sepiolite and hectorite) were combined in the filler for this example. The procedure previously described was used.

| Ingredients | Amount of Solids (% by wt.) |
|---|---|
| Glass Fiber | 9.4% |
| Aramid Fiber | 4.67% |
| Kaolin | 28.0% |
| Sepiolite | 32.7% |
| Hectorite | 18.7% |
| NBR Latex | 6.5% |
| DADMAC | |
| Addition 1 | 1.00 g |
| Addition 2 | 0.15 g |
| Drainage Aid | 0.03 g |

The coolant leakage rating was measured at the 1500 psi flange pressure.

| Density (lb/ft³) | Coolant Leakage Rating 1500 psi |
|---|---|
| 71 | 60 |

EXAMPLES 28–29

In these examples, the gel-forming filler, hectorite, is compared to exfoliated vermiculite. The procedure previously described was used.

| | Amt. of Solids (% by wt.) | |
|---|---|---|
| Ingredient | Ex. 28 | Ex. 29 |
| Glass Fiber | 9.4% | 9.4% |
| Aramid Fiber | 4.6% | 4.6% |
| Kaolin | 56.1% | 56.1% |
| Hectorite | 23.4% | — |
| Exfol. Vermiculite | — | 23.4% |
| NBR Latex | 6.5% | 6.5% |
| DADMAC | | |
| Addition 1 | 1.50 g | 0.10 g |
| Addition 2 | 0.05 g | 0.05 g |

The superior sealability provided by including hectorite instead of exfoliated vermiculite is demonstrated by comparing their coolant leakage rating at the flange pressure of 1500 psi.

| | Density (lb/ft³) | Coolant Leakage Rating 1500 psi |
|---|---|---|
| Ex. 28 | 73 | 60 |
| Ex. 29 | 71 | 21 |

The coolant leakage rating for the exfoliated vermiculite is lower than that of the hectorite. Also, in comparison to Example 3, exfoliated vermiculite does not seal as well as the chemically delaminated and cation exchanged vermiculite.

EXAMPLE 30-31

In this example hectorite allowed the latex level to be decreased while still improving the coolant leakage rating. In addition, this example contains only glass fibers. The precipitation procedure is the same as in Examples 1–5.

| Ingredient | Ex. 30 | Ex. 31 |
|---|---|---|
| Glass Fiber | 14.1% | 13.6% |
| Kaolin | 46.7% | 45.5% |
| Hectorite | 32.7% | — |
| Talc | — | 31.8% |
| NBR Latex | 6.5% | 9.1% |
| DADMAC | | |
| Addition 1 | 0.33 g | 0.10 g |
| Addition 2 | 0.05 g | 0.05 g |

The coolant leakage ratings are compared at the 1500 psi flange pressure. The creep relaxation (with ASTM Test Method No. F 38-88 Method B) was done at 400° F. also for 22 hours. The advantage of using a mineral gel-former for sealability instead of binder is evident in the leakage ratings. Torque retention was done as described for Example 16.

| | Density (lb/ft³) | Leakage Rating (1500 PSI) | Creep Relaxation | Torque Retention |
|---|---|---|---|---|
| Ex. 30 | 70 | 60 | 24% | 75.0% |
| Ex. 31 | 71 | 31 | 26% | 66.3% |

EXAMPLES 32-33

Sepiolite was combined with a non-gelling filler with higher latex and fiber levels as compared to Examples 12–15. For 32 and 33 the kaolin used also had 55% by weight of the particles less than 2 microns in diameter, and also used the method that was used in Examples 12–15, although no drainage aid was included here.

| Ingredient | Ex. 32 | Ex. 33 |
|---|---|---|
| Glass Fiber | 15% | 15% |
| Acrylic Fiber | 5% | 5% |
| Kaolin | 60% | 60% |
| Sepiolite | — | 10% |
| NBR Latex | 20% | 10% |
| DADMAC | | |
| Addition 1 | 0.20 g | 0.10 g |
| Addition 2 | 0.05 g | 0.05 g |

Sealability is indicated by the leakage rating at the 1500 psi flange pressure.

| | Density (lb/ft³) | Coolant Leakage Rating (1500 PSI) | Torque Retention |
|---|---|---|---|
| Ex. 32 | 75 | 25 | 23.8% |
| Ex. 33 | 78 | 35 | 63.8% |

EXAMPLES 34-38

A. Procedure used for Examples 34–38:

The fiber and fillers were blended in a Waring Blender with approximately 1800 ml water for one minute. The fully dispersed slurry was then diluted to a total of 6842 ml at 1.33% solids, with the temperature controlled at 100°–110° F. While stirring continuously, 3.64 grams (g) of alum was added and then 1 minute later sodium aluminate was added to get a pH of 7. Latex binder (carboxylated NBR from Reichhold) was then added, and stirring continued until the supernatant water was clear, which indicated that the latex had completely deposited on the fibers and fillers.

The resulting slurry was drained and formed into a sheet using a conventional Williams handsheet mold. The sheet was wet pressed to remove more water, then dried on a drum dryer at approximately 230° F. The sheet was trimmed and calendered to a resultant thickness of about ⅟₃₂ inch. Total sheet weight for these examples was 100.1 grams. The calendered sheets were used for properties testing.

B. Examples and Data:

These examples show that bentonite can also provide gasketing with better sealability. As the percentage of the calcium bentonite is increased relative to kaolin, (a non-gelling clay filler) better sealability is found.

The fiber was aramid (from Dupont) and the latex binder was carboxylated NBR (from Reichhold). The amounts used (listed on a dry weight basis) are:

| Ingredient | Ex. 34 | Ex. 35 | Ex. 36 | Ex. 37 | Ex. 38 |
|---|---|---|---|---|---|
| Aramid fiber | 18.2% | 18.2% | 18.2% | 18.2% | 18.2% |
| Kaolin | 72.7% | — | 54.5% | 36.35% | 18.2% |
| Bentonite | — | 72.7% | 18.2% | 36.35% | 54.5% |
| Binder | 9.1% | 9.1% | 9.1% | 9.1% | 9.1% |

The improvement in coolant sealability with increased bentonite level is shown in the following leakage ratings. The highest number (up to 60) shows the best sealability.

| | Density (lb/ft³) | Coolant Leakage Rating | | |
|---|---|---|---|---|
| | | 500 psi | 1500 psi | 2500 psi |
| Ex. 34 | 82 | 14 | 21 | 25 |
| Ex. 35 | 82 | — | 60 | 60 |
| Ex. 36 | 80 | 18 | 28 | 41 |
| Ex. 37 | 82 | 38 | 60 | 60 |
| Ex. 38 | 82 | 60 | 60 | 60 |

What is claimed is:

1. A gasket sheet material which comprises fiber at an amount of from about 5 to about 20% by total dry weight, a filler at an amount of at least about 62% by total dry weight, and optionally a binder at an amount up to about 18% by total dry weight, wherein the filler contains a gel-forming mineral filler at an amount of at least about 3% by total dry weight of the gasket sheet material, wherein the gasket sheet material has good torque retention, good creep resistance, and good sealability against fluids, wherein the filler also contains a non-gel forming filler selected from the group consisting of calcium silicate, mica, pyrophyllite, exfoliated vermiculite, talc, calcium carbonate, magnesium hydroxide, diatomaceous earth, phlogopite, silica, kaolinite, graphite, flake graphite, and cork.

2. A gasket sheet material which comprises fiber at an amount of from about 5 to about 20% by total dry weight, a filler at an amount of at least about 62% by total dry weight, and optionally a binder at an amount up to about 18% by total dry weight, wherein the filler contains a gel-forming mineral filler at an amount of at least about 3% by total dry weight of the gasket sheet material, wherein the gasket sheet material has good torque retention, good creep resistance, and good sealability against fluids, wherein the filler also contains particles of a non-gel forming filler wherein at least about 75% by weight of the particles are less than 2 microns in diameter.

3. A gasket sheet material which comprises fiber at an amount of from about 5 to about 20% by total dry weight, a filler at an amount of at least about 62% by total dry weight, and optionally a binder at an amount up to about 18% by total dry weight, wherein the filler contains a gel-forming mineral filler at an amount of at least about 3% by total dry weight of the gasket sheet material, wherein the gasket sheet material has good torque retention, good creep resistance, and good sealability against fluids, wherein the gel-forming mineral filler is selected from the group consisting of sepiolite, bentonite and hectorite.

4. A gasket sheet material which comprises fiber at an amount of from about 5 to about 20% by weight, a filler at an amount of at least about 62% by weight, and optionally a binder at an amount up to about 18% by weight, wherein the filler contains a gel-forming mineral filler at an amount of at least about 4% by total weight of the gasket sheet material, further providing that the amount of gel-forming filler is sufficient to give the gasket sheet material a sealability against polar liquids which is at least as good as the sealability which would be provided by the sheet material if it contained no gel-forming filler and the binder concentration was at least about 4% by weight higher, wherein the gel-forming filler present is selected from the group consisting of sepiolite, hectorite, and bentonite.

* * * * *